United States Patent
Gazdik (12)

(10) Patent No.: US 6,324,691 B1
(45) Date of Patent: Nov. 27, 2001

(54) MANUFACTURE OF SOFTWARE DISTRIBUTION MEDIA PACKAGES FROM COMPONENTS RESIDENT ON A REMOTE SERVER SOURCE

(75) Inventor: Charles J. Gazdik, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/191,262

(22) Filed: Nov. 12, 1998

(51) Int. Cl.$^7$ .................................................. G06F 9/445
(52) U.S. Cl. .............................. 717/11; 709/200; 709/220
(58) Field of Search ............................... 717/11; 709/200, 709/220, 223

(56) References Cited

U.S. PATENT DOCUMENTS

| | | | |
|---|---|---|---|
| 5,581,764 | * 12/1996 | Fitzgerald et al. | 717/11 |
| 5,586,304 | * 12/1996 | Stupek, Jr. et al. | 717/11 |
| 5,588,143 | * 12/1996 | Stupek, Jr. et al. | 717/11 |
| 5,671,420 | * 9/1997 | Bell et al. | 717/11 |
| 5,696,975 | * 12/1997 | Moore et al. | 717/11 |
| 5,809,287 | * 9/1998 | Stupek, Jr. et al. | 717/11 |
| 5,919,247 | * 7/1999 | Van Hoff et al. | 709/217 |

(List continued on next page.)

OTHER PUBLICATIONS

Perin, C.; "Configuration & Software Distribution in Maintenance Environments on Heterogeneous Platforms". IEEE Xplore[online], Conference on Software Maintenance, 1991, ISBN: 0–8186–2325–X, pp 269–274, Oct. 1991.*

Hites et al.; "Technology Magic: Software Distribution at Indiana University". ACM Digital Library[online], Proceedings of the 25th SIGUCCS conference on User Services: are you ready?, ISBN: 0–89791–990–4/97/0011, pp127–131, Nov. 1997.*

Hall et al.; "An Architecture for Post–Development Configuration Management in a Wide–Area Network". IEEE Xplore[online], Proceedings of the 17th International Conference on Distributed Computing Systems, 1997, ISBN: 0–8186–7813–5, pp 269–278, May 1997.*

(List continued on next page.)

*Primary Examiner*—Kakali Chaki
*Assistant Examiner*—Kelvin Booker

(57) ABSTRACT

A method for generating a custom distribution media package includes the following steps: Providing an original software suite distribution media package which includes an Internet download option; accessing a remote server via the Internet on which is loaded updated and new software related to the original suite; selecting the software components to be included in the custom media package; comparing the component files that reside on the original distribution media package with those that reside on the remote server, including the component installation data files and setup data files; identifying the most recent files and new files which do not east in the original package; identifying a local mass storage medium is identified on which the new distribution package will be created; copying the most recent files from their source locations to the new medium; and updating the installation data files and setup data files, to reference files from the new media package location. This new technology is made possible by a new fragmented installation process, for which each software component has associated therewith a unique component-specific data file which is independent of and external to the installer-processing engine, the suite installation process flow, and the other software components. The flow of the installation/uninstallation process is controlled by a separate process-control file which is read and executed by the install/uninstall processing engine.

23 Claims, 4 Drawing Sheets

U.S. PATENT DOCUMENTS

| | | | | |
|---|---|---|---|---|
| 5,953,533 | * | 9/1999 | Fink et al. | 717/11 |
| 5,960,189 | * | 9/1999 | Stupek, Jr. et al. | 717/11 |
| 5,966,540 | * | 10/1999 | Lister et al. | 717/11 |
| 6,049,671 | * | 4/2000 | Slivka et al. | 717/11 |
| 6,063,134 | * | 5/2000 | Peters et al. | 717/11 |
| 6,125,388 | * | 9/2000 | Reisman | 709/218 |

OTHER PUBLICATIONS

Kitahara et al.; "Distributed Management for Software Maintenance in a Wide–Area Railway System". IEEE Xplore[online], 3rd International Symposium on Autonomous Decentralized Systems, 1997, ISBN: 0–8186–7783–X, pp 311–318, Apr. 1997.*

Amir, et al.; "Group Communication as an Infrastructure for Distributed System Management". IEEE Xplore[online], 3rd International Workshop on Services in Distributed and Networked Environments, 1996, ISBN: 0–8186–7499–7, pp 84–91, Jun. 1996.*

Novadigm Incorporated; "Novadigm Announces Alliance with HP for HP–UX Version of Enterprise Desktop Manager". Accessed on Sep. 25, 2000. Retrieved from the Internet: Http://www.novadigm.com/company/newsroom/archieve/ar02.htm, Jun. 1994.*

Novadigm Incorporated; "Novadigm Announces Integration with IBM/Tivoli's TME 10 to automatically adapt software to "personalized" user configurations". Accessed on Sep. 25, 2000. Retrieved from the Internet: Http://www.novadigm.com/company/newsroom/archieve/, Nov. 1997.*

Novadigm Incorporated; "Enterprise Desktop Manager (EDM) Version 4.0". Accessed on Sep. 25, 2000. Retrieved from the Internet: Http://www.novadigm.com. Sep. 1997.*

Yau et al.; "An Approach to Distributed Component–Based Real–time Application Software Development". IEEE[online], 1998 First International Symposium on Object–Oriented Real–time Distribution Computing, Apr. 1998, pp. 275–283.*

Aoyama et al.; "A Commerce Broker of Software Components and its Experience". IEEE[online], Proceedings of the Second International Enterprise Distributed Object Computing Workshop, Nov. 1998, pp. 155–162.*

Bakker et al.; "Design and Evaluation of the Distributed Software Component Framework for Distributed Communication Architectures". IEEE[online], Proceedings of the Second International Enterprise Distributed Object Computing Workshop, Nov. 1998, pp. 282–288.*

Hofmeister et al.; "Surgeon: a packager for dynamically reconfigurable distributed applications". IEEE[online], Software Engineering Journal, Mar. 1993, vol. 8, Iss. 2, pp. 95–101.*

Majapuro et al.; "A modular software architecture for manufacturing control". IEEE[online], Proceedings of the third IEEE conference on control applications, Aug. 1994, vol. 3, pp 1745–1750.*

Mi et al.; "A knowledge–based software process library for process–driven software development". Research Index[online], Jun. 1992.*

Tsichritzis et al.; "Towards software communities and software clearing houses". IEEE[online], Computing and Control Engineering Journal, vol. 3, Iss. 1, pp. 35–42.*

* cited by examiner

The method for generating custom distribution media packages includes the steps of:

1. Including an Internet download option on an original distribution media package;

2. Accessing an Internet site having software suite installation files;

3. Selecting the components which are to be included in the custom distribution media package;

4. Comparing locally resident component files with those at the Internet site;

5. Identifying a new medium on which the custom distribution media package will be created;

6. Copying required files to the new medium from the distribution media package and/or the remote site; and 7. Updating the installation data files, including the setup data files, to reference files resident on the new medium.

MANUFACTURE OF SOFTWARE DISTRIBUTION MEDIA PACKAGES FROM COMPONENTS RESIDENT ON A REMOTE SERVER SOURCE

This application is related to co-pending application (Attorney Docket No. 10981960-1), titled SOFTWARE INSTALLATION USING ABSTRACT DATA, which was filed on Nov. 12, 1998.

FIELD OF THE INVENTION

This invention relates to methods used to manufacture software distribution media packages. It also relates to methods for downloading software from a remote server source via the Internet.

BACKGROUND OF THE INVENTION

Presently used methods of creating a software distribution package are incapable of building a custom distribution media package which incorporate unknown or updated software components available at remote server sites via the Internet. In fact, existing technology is incapable of creating from an existing distribution media package of a software suite, a custom distribution media package which includes only a subset of selected software components from the suite. It is axiomatic that the only media package available to an end user is one which has an original installation program designed to install an entire suite of software A further disadvantage of the existing technology is that it does not integrate the Internet into the distribution media building process. This means that software components installed from a user's distribution media, whether it be a set of floppy diskettes or a CD-ROM, disk is probably an obsolete version, when compared with the same software that is available from the software developer/manufacturer via the Internet. Most software companies post new versions of their software and device drivers on the Internet in order to provide their users with greater functionality. Many large companies have Management Information Systems (MIS) support personnel, whose job it is to make the updated software available to the users whom they support. In addition to using updated distribution media, which are released by the software developer/manufacturer at regular intervals, the MIS support personnel also have the option to download more recent versions of supported software from Internet sites. Merely keeping track of updated software availability can be a time-consuming task, particularly if multiple Internet suites must be browsed manually in order to keep multiple software packages updated. Furthermore, in order to utilize updated software resident on servers accessible via the Internet, the following steps must be followed:

1. Each available software component must be downloaded from the remote server in a compressed executable form;
2. The compressed files which make up the software component, as well as the associated setup files must be decompressed;
3. The setup program must then be run in order to install the software on the local computer system; and
4. If multiple end users require the updated software component, the setup steps must be run on each end user system.

What is needed is a more flexible process for creating distribution media. The process should be able not only to generate media containing only a subset of the original software suite, but it should integrate the Internet into the distribution media building process so that new and updated software components can be integrated into the media.

SUMMARY OF THE INVENTION

This invention makes possible the generation of customized distribution media package that can include a subset of software components from a larger suite of components. The customized distribution media package can include new or updated software components retrieved from a remote server via the Internet, or just a subset of the original software suite, no matter how old the original software distribution media is. The new distribution media generation process is flexible, in that it can include software components which were unknown at the time the original distribution media package was manufactured. Any software development company using this technology can deploy new and updated software to its customers by performing a virtual an updatable in-box software roll, which can be updated over the Internet even after the product has shipped. This will eliminate the need for end-user MIS personnel to perform several download, extract, and setup steps because the media packager handles the downloading and integrating of the new software into a new distribution media package which the MIS personnel need run only once to load all of the new software. Once the new distribution media package has been verified, MIS personnel can add a switch to the installation program that will install the software on an end user's machine without requiring any user interaction. This allows MIS personnel to put the setup program in a log-in script that will be executed for each user as that user connects his client machine to the company network, thereby greatly automating the software component installation and upgrade process.

The present invention is made possible by a new abstract data software installation process, which is the subject of the heretofore-identified, related patent application. A summary of that new installation process is in order. Rather than using the prior art script-based installation process, in which the entire installation process procedure is encapsulated in a single script, the installation process is fragmented so that the installation or uninstallation of individual components of a software suite is controlled by multiple independent files, rather than by a single script file. Each software component has associated therewith a unique component-specific data file which is independent of and external to the installer-processing engine, the suite installation process flow, and the other software components. Each component-specific data file contains not only the installation criteria that is used to determine whether or not a software component is installable on a particular computer system, and how to optimize installation of the component on a particular system, but also the command sequences which must be executed for installation and unexecuted during uninstallation. The flow of the installation/uninstallation process, on the other hand, is controlled by a separate process-control file which is read and executed by the install/uninstall processing engine. Fragmentation of the installation process in this manner isolates the intelligence required to install and uninstall a specific software component, thereby separating installation flow information from component installation information. Since the installation of individual software components is no longer tied to the installation process flow, the installer-developer can change the installation flow without affecting information related to individual software components. Likewise, the characteristics of individual software components can be modified without risking corruption of the install/uninstall process flow. Gone is the need to recompile or rebuild an installation package because the information required to perform an install or uninstall is stored in separate data files, outside of the core install/uninstall processing engine. A component data file may reside at any accessible location, which makes integrated installation from on a remote server accessible over the Internet feasible. Component data files that were not in existence at the time the original software distribution package was created can be supplied with new or updated software components via the Internet so that those components can be integrated into an existing software suite at installation run time.

The new installation process has been developed using Object Orientated Analysis and Design (OOAD) in a C++ programming language environment. Both the component-specific data files and the process-control files are represented as objects. The component-specific data files are represented as persistent objects. The term persistent refers to a unique type of C++ object that may be saved as a file on a mass storage device. When called upon at a later time, even by another computer system, the saved object is cable of restoring itself, including all related child members. Each component persistent data file contains the characteristics of the software component, as well as the commands to be executed for installation and unexecuted during uninstallation. The process-control file, which is represented as a state object, is executed by a state machine which functions as the install-uninstall processing engine.

Returning now to the invention at hand, the generation, or manufacturing, of custom distribution media packages is accomplished through the following six-step process:

1. Providing on each original distribution media package, whether it be a set of diskettes, a removable disk or a CD-ROM or DVD disk an Internet download option, which the user can select in order to receive the most recent versions of components belonging to his software suite;
2. Accessing the software developer's site on the Internet;
3. Selecting which software components the user desires to include in the new distribution media package (these components could be a subset of available components, and it they may include components which were unknown when the original package was manufactured);
4. For the software components which have been selected, comparing component files that reside on the original distribution media package with those that reside on the remote server, including the component installation data files;
5. Identifying a mass storage medium on which the new distribution package will be created (for medium types of limited storage space such as floppy diskettes, the files are organized according to floppy diskette numbers, with respect to the size of each file and the amount of free space on a diskette);
6. Copying required files to the new distribution medium (new files and updated versions of existing files are downloaded from the developer's Internet site, while sill current files are copied from the original media package); and
7. Updating the installation data files, including the setup data files, to reference files from the new media package location.

Once the new distribution media package has been created, a user can then run the setup program in order to install the software components that were included in the new media package.

DESCRIPTION OF THE DRAWINGS

FIG. 4 provides a listing of the steps in the process for creating a custom software distribution media package.

DETAILED DESCRIPTION OF THE INVENTION

Figure 1:
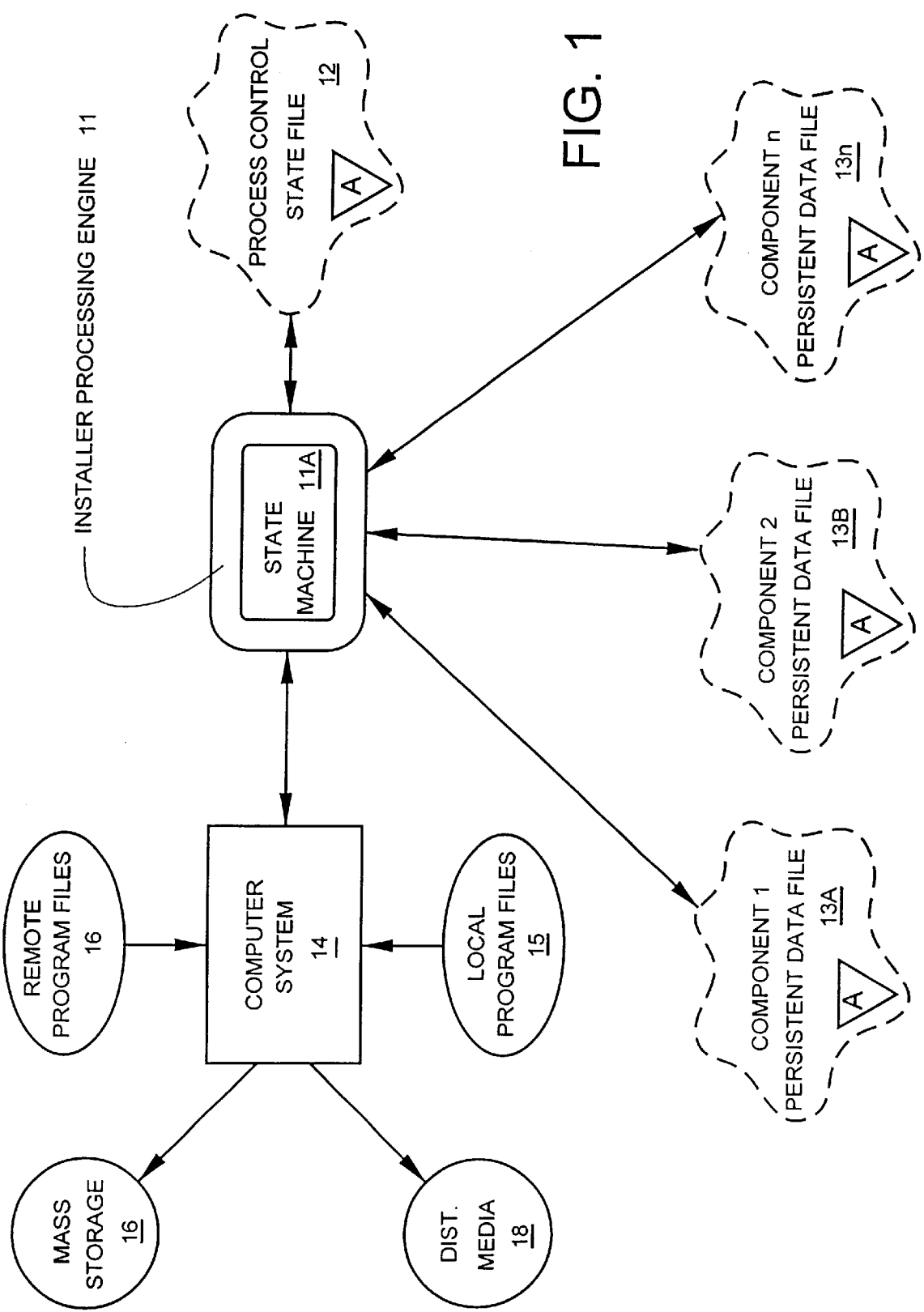
FIG. 1 is a diagrammatic summary of the invention.

This invention is a method for generating customized distribution media packages for suites of software containing multiple software components. The customized distribution media package can include new or updated software components retrieved from a remote server via the Internet, or just a subset of the original software suite, no matter haw old the original software distribution media is. The new distribution media generation process is flexible, in that it can include software components which Were unknown at the time the original distribution media package was manufactured.

The present invention is made possible by a new abstract data software installation process, which is the subject of the heretofore-identified, related patent application. Because the present invention may be considered a superset of the abstract data software installation process, the elements of that process will be described in this application in detail.

The abstract data software installation process utilizes a fragmented approach, whereby the installation or uninstallation of each component of a software suite is controlled by multiple independent files, rather than by a single script file. Each software component has associated therewith a unique component-specific data file which is independent of and external to the installer-processing engine, the suite installation process flow, and the other software components. Each such data file contains the characteristics of the software component, as will as the commands to be executed for installation and unexecuted during uninstallation. The flow of the installation/uninstallation process is controlled by a separate process-control file which is read and executed an install/uninstall processing engine, which for a preferred embodiment of the invention, incorporates a state machine. Fragmentation of the installation process in this manner isolates the intelligence required to install and uninstall a specific software component, thereby separating installation flow information from component installation information. This new technology not only facilitates the addition of new functionality to an existing software suite, but also facilitates the creation of custom distribution media.

The new installation process has been developed using Object Orientated Analysis and Design (OOAD) in a C++ programming language environment. Both the component-specific data files and the process-control files are represented as objects. The component-specific data files are represented as persistent objects. The term persistent refers to a unique type of C++ object that is capable of saving itself to a mass storage device. When called upon at a later time, the saved object is cable of restoring itself, including all related child members. Each component persistent data file contains the characteristics of the software component, as well as the commands to be executed for installation and unexecuted during uninstallation. The process-control file, which is represented as a state object, is executed by a state machine which functions as the install-uninstall processing engine. This process is represented diagrammatically in FIG. 1. An installer processing engine 11, which incorporates a state machine 11A runs on a computer system 14. The process floe of the processing engine 11 is controlled by a process control state file 12. The process control state file 12 directs the state machine 11 to call on the component persistent data files 13A–13B in an ordered sequence. Each of the persistent data files 13A–13B provides the state machine 11 with the information required to install/uninstall a single software component, which are identified as component 1, component 2, and component n. This information is used to control a computer system 14, which installs a collection of selected uninstalled program files (those files 15 from the original distribution media package, and the new or updated files 16 from the remote server) a connected mass storage device 16.

Still referring to FIG. 1, the present invention differs from the heretofore described invention in that the selected uninstalled program files (15 and 16), the installer processing engine 11, the process control state file 12, and the component persistent data files 13A, 13B . . . 13n, are copied to a new distribution medium 18.

Because installation information for a specific software component resides in a component persistent data file, the manner in which a software component is installed can be changed with relative ease and rapidity, without affecting the install flow or how other software components are installed. Additionally, the installer/developer need not define a separate uninstall process, as the uninstall process is the reverse of the install process. The install/uninstall processing engine need simply unexecute the installation steps. A related advantage of the new install/uninstall process is that the install and uninstall process is driven by the same engine, allowing the installer/developer to change the install and uninstall flow by simply modifying the existing process control state object file or providing a new process control state object file. The install/uninstall state object file is, of course, completely independent of the software components which are being installed or uninstalled. State object files are generally modified using a State Transition Editor, which by ensuring the integrity of the data file, greatly reduces the chances that defects will be introduced into the process sequences common problem during the manual modification of script files.

This new installation technology has another significant advantage over script-based installation technology. Component persistent data files and the state file which controls the entire software installation process can reside at any accessible location, whether it be a local storage device or a remote server. Thus, a seamless integration of both local and remote software components is now possible. For example, with access to the Internet during software installation, the install process becomes a dynamic installation vehicle that modifies how any software component is installed. In addition to being able to modify the install flow or add new or modified software components at run time by downloading a new state file or a new component persistent data file from the remote server, the installer engine itself can be updated as well, by simply downloading a new installer engine version from the remote server over the Internet. Only the n and updated files need be downloaded from the remote server, thereby minimizing the amount of information that must be downloaded from the remote server.

As previously stated, the new installation technology was developed, using OOAD, by breaking down the install/uninstall process and defining each task as an object. Each object has unique responsibilities with respect to the process. A detailed discussion of state objects will now be undertaken. Persistent objects will be subsequently dealt with.

Figure 2:
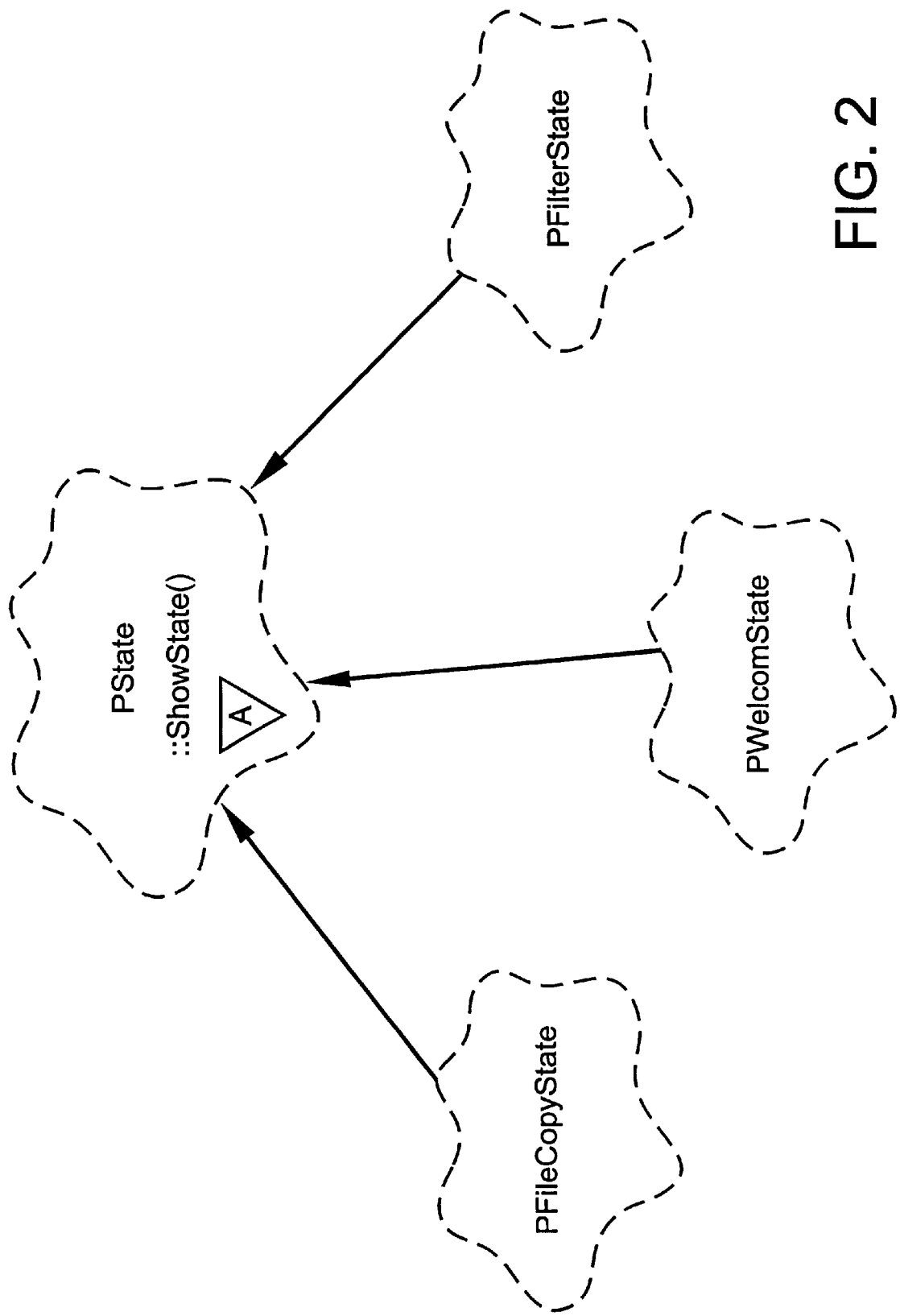
FIG. 2 depicts a hierarchy of some of the state objects utilized in a representative install/uninstall process.

State objects are files which execute specific tasks within the install/uninstall flow. Each state object is defined as a C++ class. FIG. 2 depicts a hierarchy of some of the state objects utilized in a representative install/uninstall process. Each abstract base class is identified by a downwardly-pointing equilateral triangle which encloses the letter "A". A state machine loads and runs each state object. The state may be displayed to the end user if that type of functionality is specified by the state object. Each state object defines a transition tale in the state file, which the state machine reads and processes to produce a return code. The state machine transitions from that state object to another by evaluating the return code. Each state object has a specific task For example, it may prompt the end user to provide a directory name and location; it may ask the user to identify those software components which he desired to install; or it may make one of many other install/uninstall-related queries. The functionality of a state object is defined by its ::ShowState( ) method, which the state machine calls and executes. A new state can be added as a derivative of the PState object. By overriding the ::ShowState( ) method. This new state can provide any functionality that is needed for an install or uninstall process. The architecture provided by the present invention facilitates the addition of new install/uninstall state functionality.

The install/uninstall processing engine 11, which incorporates a state machine 11A, must have know edge of a state object before it can create and load the state from the state file. The state machine is programmed to recognize a default set of states that provide the necessary functionality to install and uninstall many different types of software components. Some states are generic in their functionality. For example, displaying a dialog to the end user and waiting for a user response is such a generic state. The fact that generic states can be reused repeatedly during the install process helps eliminate redundant logic that would be required in a script-based installer.

As previously stated, a persistent object is a unique type of C++ object that, once saved as a file by one system, is capable of restoring itself, including all related child members, when called on by either the same system or a different system.

Figure 3:
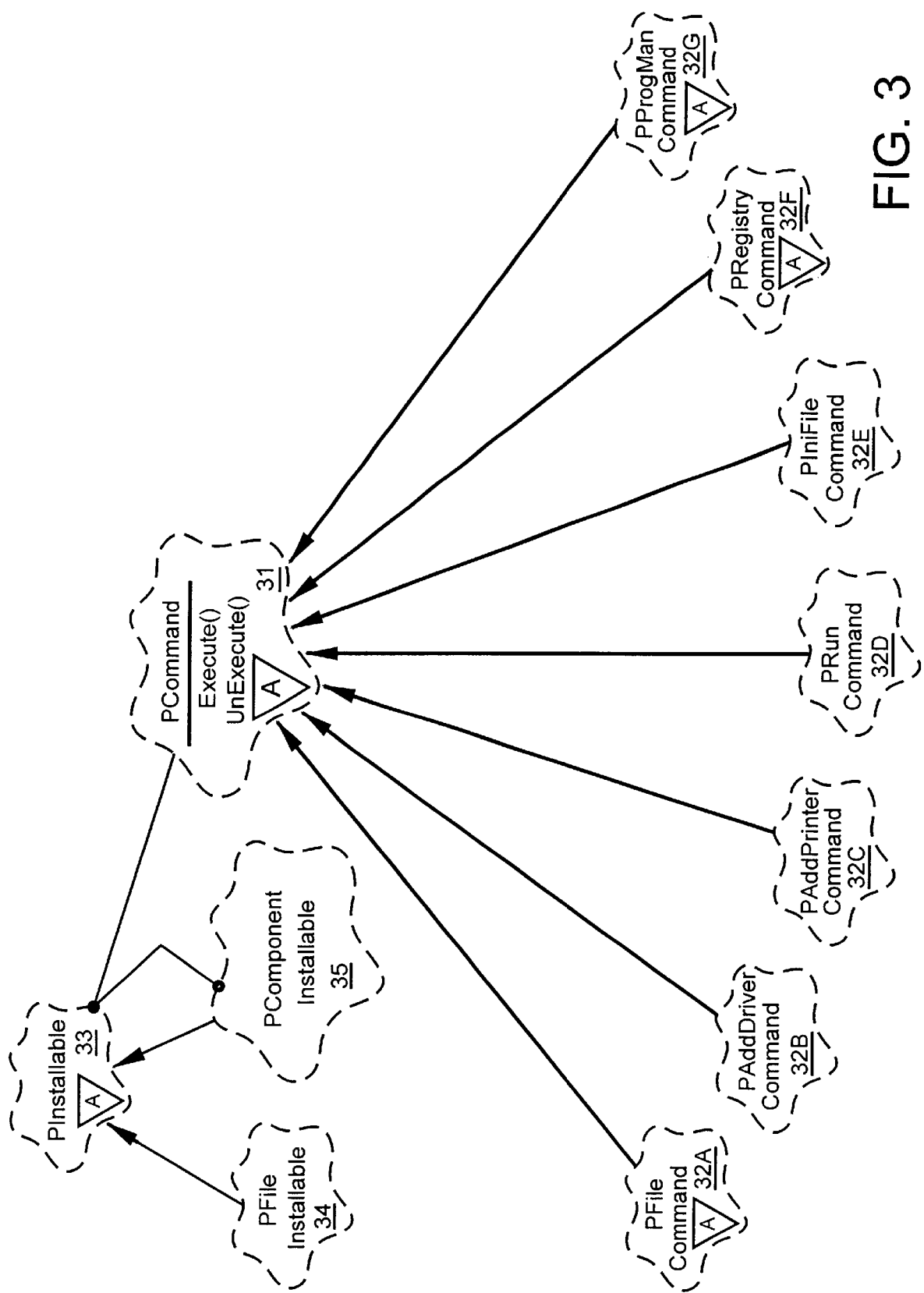
FIG. 3 depicts a hierarchy of some of the software component persistent objects utilized in a representative install/uninstall process.

The importance of such an object lies in its ability to completely and faithfully regenerate a previously existing object structure. FIG. 3 depicts a hierarchy of some of the software component persistent objects utilized in a representative install/uninstall process.

Software components are nothing more than a collection of physical files which, when installed and properly configured on a user's computer system, provide some particular functionality, service, or act as an interface to a device connected to the user's computer system. In the context of the present invention and with reference to FIG. 3, a software component is referred to as a PComponentInstallable object, which derives from a PInstallable object which, in turn, derives from an MPersistent object that provides the basic persistent functionality. The Pinstallable object refers to something that can be installed on a user's computer system. This something can be a physical file or a collection of files that constitute the logical software component. The PComponentinstallable object represents the logical software component that can be installed on the computer system. It can include physical files requiring installation, which are represented by PFileInstallable objects, as well as configuration settings that must be made before the software component will function property. The PCommand persistent object represents these software configuration settings at the base class level.

Still referring to FIG. 3, PCommand and PInstallable objects are both abstract objects that define the fundamental building blocks of this installation process architecture. Any object that derives from the PInstallable object also has a list of PCommand objects, which tell the install engine which tasks must be executed during the install process, as well as unexecuted during the uninstall process. Command objects which derive from Pcommand, are those which do the work of copying files, adding or deleting registry values, renaming files, and executing files which install or uninstall a software component. Some tasks, such as copy a file, or add a registry key and value, are required by every installation process. The functionality provided by these two particular tasks is encapsulated in the respective command objects (PCopyFile) and (PAddValueRegistry). Though not shown in the hierarchy of FIG. 3, the object PcopyFile is derived from the abstract base class PFile Command. Likewise, PAddValueRegistry is derived from the abstract base class PRegistry Command. Because PCommand provides the method declarations for ::Execute( ) and ::UnExecute( ), each of the derived command objects incorporates those same method declarations. The ::Execute( ) method is called during installation, while the ::Unexecute( ) method is called during uninstallation.

Persistent objects also contain conditional information that is used by the install/uninstall engine to determine how a PInstallable object will be installed and if and when a PCommand object will be executed during installation or unexecuted during uninstallation. These install/uninstall conditions (PInstallCondition) also derive from the MPersistent object so that the install conditions can be saved with the software components in the component persistent data file. The install conditions tell the install engine what operating system is required, user type and permissions, and various other types of conditional installation criteria that must be met before any PCommand can be executed or any PInstallable can be installed on a user's machine.

In addition to the installation criteria which determines if and when something can be installed, the PCommand object also contains a member that is used to determine at what point in the install or uninstall process it can call the ::Execute( ) or ::UnExecute( ) methods. It is called the Priority member, because this member determines the priority of the command during the install and uninstall process. A priority value can range between 0 and 100, with 0 being assigned to those commands which will be called first, and 100 being assigned to those commands which have the least priority. The Priority member thus provides the developer with the ability to apply some sequencing logic to the install and uninstall processes, without having to modify any code or scripts.

Another member of the PCommand object allows the install program developer to specify whether a command is meant for both normal installation and uninstallation processes, or is exclusive to the install process, or to the uninstall process. For a normal install process, the command ::Execute( ) method is called; for a normal uninstall process the command ::UnExecute( ) method is called. The other values provide the installer/developer with the ability to limit or refine the functionality of an uninstall or install process, by removing a call to ::Execute( ) during uninstallation and to::UnExecute( ) during installation. This adds a second level of logic encoding into the persistent command objects, which doesn't require the installer/developer to write any additional code or script logic to handle these special conditions.

As can be appreciated from the foregoing explanation, the new install/uninstall process provides a robust, flexible architecture that can be adapted to meet any future installation/uninstallation task Since the installation of individual software components is no longer tied to the installation process flow, the installer-developer can change the installation flow without affecting information related to individual software components. Likewise, the characteristics of individual software components can be modified without risking corruption of the install/uninstall process flow. Gone is the need to recompile or rebuild an installation package because the information required to perform an install or uninstall is stored in separate date files, outside of the core install/uninstall processing engine. A component data file may reside at any accessible location, which makes integrated installation from on a remote server accessible over the Internet feasible. Component data files that were not in existence at the time the original software distribution package was created can be supplied with new or updated software components via the Internet so that those components can be integrated into an existing software suite at installation run time.

Any software development company using the foregoing installation technology can deploy new and updated software to its customers by performing a virtual an updatable in-box software roll, which can be updated over the Internet even after the product has shipped. This will eliminate the need for end-user MIS personnel to perform several download, extract, and setup steps because the media packager handles the downloading and integrating of the new software into a new distribution media package which the MIS personnel need run only once to load all of the new software. Once the new distribution media package has been verified, MIS personnel can add a switch to the installation program that will install the software on an end user's machine without requiring any user interaction. This allows MIS personnel to put the setup program in a log-in script that will be executed for each user as that user connects his client machine to the company network thereby greatly automating the software component installation and upgrade process.

Although only a single embodiment of the invention has been heretofore described, it will be obvious to those having ordinary skill in the art that changes and modifications may be made thereto without departing from the scope and the spirit of the invention as hereinafter claimed.

What is claimed is:

1. A method for generating custom distribution media packages for a suite of software components, said method comprising the steps of:

providing an installation processing engine;

abstracting an installation process for the suite so that each software component has associated therewith a component-specific data file, each component-specific data file including a collection of component persistent objects, each component persistent object defining either a particular characteristic of the associated software component or a command required for the installation of the associated software component, and the suite has associated therewith a process control file, said process control file including a collection of state objects, each of which defines a single step in the installation process flow, said process control file controlling the ordered accessing of the component-specific data files by the installation processing engine;

including a link to a remote server site where new or updated component-specific data files and an updated process control file may be stored, said link being present on an original distribution media package which contains an original set of the component-specific data files, the process control file and the installation processing engine;

selecting the components of the suite which are to be included in a new distribution package;

identifying a medium on which the new distribution package will be created;

accessing the remote server site;

comparing component-specific data files present on the original distribution media with those at the remote server site;

copying component-specific data files for the selected components and an updated process control file from the remote site if those component-specific data files have been updated since the original distribution media package was created;

copying component-specific data files for the selected components from the original distribution media package if they have not been updated since the original distribution media package was created;

updating installation data files, including setup data files, to reference files now resident on the new distribution package medium.

2. The process of claim 1, wherein said state machine evaluates a return code during the execution of each state object, said return code being found in a transition table residing in an abstract base class object which the state machine processes in order to transit on to the next designated state.

3. A method for generating custom distribution media packages for a suite of software components, said method comprising the steps of:

providing a suite installation process which separates control of the installation process from installation tasks associated with each of the software components whereby each software component has associated therewith a component-specific data file represented as a persistent object, and the suite has associated therewith a process control file, represented as a collection of state objects, which controls the ordered accessing of the component-specific data files;

providing an installation processing engine, which includes a state machine, said processing engine serving to execute said process control file;

selecting the components of the suite which are to be included in a new distribution package;

identifying a medium on which the new distribution package will be created;

copying required files to the new distribution medium; and updating installation data files, including setup data files, to reference files now resident on the new distribution package medium.

4. The method of claim 3, wherein a first set of component-specific data files, a first process control file and the installation processing engine are provided on an original distribution package medium having an option for accessing a remote server on which is stored the latest versions of the component-specific data files, the process control file and the processing engine.

5. The method of claim 4, which further comprises the step of comparing component-specific data files on the original distribution package medium with those on the remote server.

6. The method of claim 5, wherein files copied to the new distribution medium are downloaded from the remote server if they have been updated since the original distribution media package was created.

7. The method of claim 5, wherein files copied to the new distribution medium are taken from the original distribution package if they have not been updated since the original distribution media package was created.

8. The method of claim 3, wherein files copied to the new distribution medium include new files resident on the remote server.

9. The method of claim 3, wherein each component persistent data file comprises a collection of component persistent objects, each of which defines either a particular characteristic of the associated software component or a command required for the installation of the associated software component.

10. The process of claim 3, wherein each state object is responsible for executing a specific task with regard to the installation process.

11. The process of claim 3, wherein said state machine evaluates a return code during the execution of each state object, said return code being found in a transition table residing in an abstract base class object which the state machine processes in order to transition to the next designated state.

12. A method for generating a custom distribution package for the installation of a suite of individual software components, said method comprising the steps of:

providing a component-specific data file for each software component, each data file containing install information and install logic that is unique to its associated component;

providing a process control file that is independent of the data files, said process control file containing information related to the ordered accessing of the various component-specific data files;

providing a processing engine which executes the process control file;

providing a remote server site where new or updated component-specific data files and an updated process control file may be stored;

providing original distribution media having a download option from the remote server site;

identifying a new medium on which the custom distribution package will be created;

accessing the remote server site;

copying selected component-specific data files from both the original distribution media and from the remote server site to the new medium; and copying a process control file from either the original distribution media or from the remote server site to the new medium.

13. The method of claim 12, wherein said remote server site may also store an updated processing engine.

14. The method of claim 12, wherein both the original distribution media and the custom distribution package include installation data files.

15. The method of claim 14, which further comprises the step of updating the installation data files to reference files resident on the new medium.

16. The method of claim 12, wherein said processing engine is a state machine, and said process control file is a state file comprising a collection of state objects, each of which defines a single step in the installation process flow, and which jointly define the flow of the installation process.

17. The method of claim 12, wherein each component-specific data file is a component persistent data file comprising a collection of component persistent objects, each of which defines either a particular characteristic of the associated software component or a command required for the installation of the associated software component.

18. The method of claim 12, which further comprises the steps of:
- comparing files resident on the original distribution media with those resident on the remote server; and
- copying files from the remote server only if they have been updated since the original distribution media was created.

19. An original distribution media package from which a suite of software components is installable on a computer system, said media package including thereon:
- a state machine;
- a component-specific data file for each software component, each component-specific data file being a collection of component persistent objects, each of which defines either a particular characteristic of the associated software component or a command required for the installation of the associated software component; and
- a process control file, represented as a collection of state objects, each of which is responsible for executing a specific task required for installation of a software component, said process control file controlling the ordered accessing of the component-specific data files by the installation processing engine during software suite installation.

20. The media package of claim 19, wherein each component-specific data file is represented as a persistent object, said process control file is represented as a collection of state objects.

21. The media package of claim 19, which further comprises an option for accessing a remote server on which are loaded any updated files relating to the software suite and the process for its installation.

22. The media package of claim 21, wherein provision is made for comparing files resident on the media package with those on the remote server.

23. The media package of claim 19, wherein said state machine is programmed to evaluate a return code during the execution of each state object, said return code being found in a transition table residing in an abstract base class object which the state machine processes in order to transition to the next designated state.

* * * * *